United States Patent [19]

Worschech et al.

[11] Patent Number: 5,248,333
[45] Date of Patent: Sep. 28, 1993

[54] MIXTURES OF FATTY ACID ALKYLENE DIAMIDES, FATTY ACID ESTERS AND METAL SOAPS, AND THEIR USE AS ADDITIVES IN PLASTICS

[75] Inventors: Kurt Worschech, Loxstedt; Erwin Fleischer, Bremerhaven-Spaden; Peter Wedl, Bremerhaven; Frido Loeffelholz, Bremerhaven-Surheide, all of Fed. Rep. of Germany

[73] Assignee: Neynaber Chemie GmbH, Loxstedt, Fed. Rep. of Germany

[21] Appl. No.: 773,581

[22] PCT Filed: May 10, 1990

[86] PCT No.: PCT/EP90/00754
§ 371 Date: Nov. 19, 1991
§ 102(e) Date: Nov. 19, 1991

[87] PCT Pub. No.: WO90/14332
PCT Pub. Date: Nov. 29, 1990

[30] Foreign Application Priority Data

May 19, 1989 [DE] Fed. Rep. of Germany ....... 3916356

[51] Int. Cl.$^5$ .................................................. B28B 7/38
[52] U.S. Cl. ................................. 106/38.24; 106/38.7
[58] Field of Search ................... 106/38.24, 38.7, 244, 106/287.25

[56] References Cited

U.S. PATENT DOCUMENTS

| | | | |
|---|---|---|---|
| 2,861,048 | 11/1958 | Wright et al. | 106/287.24 |
| 3,122,504 | 2/1964 | Wedell | 252/8.75 |
| 3,141,787 | 7/1964 | Goetze et al. | 106/287.25 |
| 4,049,680 | 9/1977 | Blackforq | 106/38.24 |
| 4,575,428 | 3/1986 | Clapper et al. | 252/8.5 P |
| 4,900,769 | 2/1990 | Kimura et al. | 524/227 |

*Primary Examiner*—Mark L. Bell
*Assistant Examiner*—M. Einsmann
*Attorney, Agent, or Firm*—Ernest G. Szoke; Wayne C. Jaeschke; Norvell E. Wisdom, Jr.

[57] ABSTRACT

Mixtures of light colored bis($C_8$–$C_{22}$ fatty acid) alkylene diamides, $C_8$–$C_{22}$ fatty acid esters, and, if desired, metal soaps of $C_8$–$C_{22}$ fatty acids can be obtained if, in a melt containing fatty acids with 8 to 22 carbon atoms, a part of the fatty acids are condensed to the corresponding fatty acid diamides with diamines of the general formula $NH_2$—R—$NH_2$, in which R is a straight chain, branched, or cyclic alkylene group with 2 to 12 carbon atoms; a part of the fatty acids are esterified with fatty alcohols with 8 to 22 carbon atoms and/or multifunctional alkanols with 2 to 15 carbon atoms and 2 to 6 hydroxyl groups; and, if desired, a part of the fatty acids are converted to the corresponding metal soaps with basic compounds of divalent metals. The condensation with the diamines is carried out before the esterification of the fatty acids with fatty alcohols and/or multifunctional alkanols. The mixtures so obtained can be used as additives in plastics.

20 Claims, No Drawings

MIXTURES OF FATTY ACID ALKYLENE DIAMIDES, FATTY ACID ESTERS AND METAL SOAPS, AND THEIR USE AS ADDITIVES IN PLASTICS

BACKGROUND OF THE INVENTION

1. Field of the Invention

The invention relates to a process for the preparation of mixtures of light-colored bis($C_8$–$C_{22}$-fatty acid) alkylenediamides and $C_8$–$C_{22}$-fatty acid esters and also, if desired, metal soaps of $C_8$–$C_{22}$-fatty acids.

2. Statement of Related Art

Bis($C_8$–$C_{18}$-fatty acid) alkylenediamides, for example ethylenediamine distearate, are employed in the plastics industry as additives. They are used as slip agents, for example in the processing of rigid and plasticized PVC compositions, and impart excellent anti-block properties to the finished products, for example films. They are also suitable, however, for use as slip agents and mold release agents for plastics based on polystyrene. They are also employed in other thermoplastics, for example in the processing of polyesters and polyamides. In comparison with other slip agents and mold release agents they have high melting points (about 140° C.). They therefore have no unfavorable effect on the heat distortion point of the plastics treated with them. By virtue of their properties, which can be assessed as physiologically acceptable, they are used for the preparation of PVC compositions for food packaging, pharmaceutical packaging, toys and medicinal tubing.

The starting materials for the bis($C_8$–$C_{22}$-fatty acid) alkylenediamides, described below as fatty acid alkylenediamides, for example ethylenediamine or hexamethylenediamine, are very sensitive to oxidation at the reaction temperatures required for the reaction with fatty acids (about 170° C.); the reaction with fatty acids is therefore expediently carried out under a protective gas or with the exclusion of air or oxygen. The fatty acid alkylenediamides are also similarly sensitive when they are used for making up by spraying or flaking. Normally, i.e. in the presence of air or oxygen, this results in discoloration, so that brown colored end products are obtained. Although it is also possible to convert fatty acid alkylenediamides into suitable made-up products of a small particle size by grinding, this is a labor-intensive and expensive measure.

For the reasons mentioned above, special equipment is required for the preparation of fatty acid alkylenediamides. It is not possible to carry out their preparation in an adequate quality in customary industrial equipment (esterification equipment or spray towers).

DESCRIPTION OF THE INVENTION

The invention is based on the realization that the abovementioned disadvantages of sensitivity to oxidation of alkylenediamines and fatty acid alkylenediamides can be avoided if mixtures of fatty acid alkylenediamides, fatty acid esters and, if desired, metal soaps of fatty acids are prepared in a melt containing the fatty acid. With respect to their action as additives for plastics, the fatty acid alkylenediamides present in the mixtures are equivalent to the pure fatty acid alkylenediamides.

Accordingly, the invention relates to a process for the preparation of mixtures of light-colored bis($C_8$–$C_{22}$-fatty acid) alkylenediamides and $C_8$–$C_{22}$-fatty acid esters and also, if desired, metal soaps of $C_8$–$C_{22}$-fatty acids, in which process a part of the fatty acids is subjected, in a melt containing fatty acids having 8 to 22 carbon atoms, to a condensation reaction with diamines of the general formula $$NH_2-R-NH_2$$

in which R is a linear, branched or cyclic alkylene group having 2 to 12 carbon atoms, to give the corresponding fatty acid diamides, a part of the fatty acids is esterified with fatty alcohols having 8 to 22 carbon atoms and/or polyfunctional alkanols having 2 to 15 carbon atoms and 2 to 6 hydroxyl groups, and also, if desired, a part of the fatty acids is reacted with basic compounds of divalent metals to give the corresponding metal soaps, the condensation reaction of the fatty acids with the diamines being carried out before the esterification of the fatty acids with the fatty alcohols and/or polyfunctional alkanols.

One of the advantages of the process of the invention is based on the fact that the amidation is carried out in an excess of fatty acid. In this reaction the fatty acid required for the amidation and esterification and also, if desired, the formation of metal soaps is employed in the form of a melt. This has the advantage that a rapid reaction takes place even if the duration of the amidation is prolonged, the molten acid acting as a diluent and protective medium for the fatty acid alkylenediamides. It is also possible to bring the amidation to an end very quickly, so that no free amine remains in the reaction mixture. Nevertheless, it is preferable to carry out the amidation step under a protective gas. On the other hand, the esterification step and the formation of soaps can be carried out under normal conditions, i.e., without a protective gas. The reaction mixture can be atomized and flaked without difficulty under standard conditions; the fatty acid esters present and, if desired, the metal soaps in this case protect the amide wax formed from reactions with atmospheric oxygen.

Suitable $C_8$–$C_{22}$-fatty acids for the process of the invention are those of synthetic, or especially natural, origin, such as can be obtained, for example, from vegetable and animal fats and oils, in particular palm oil, palm kernel oil, coconut oil, soya oil, rapeseed oil, sunflower seed oil, beef tallow and lard. As is customary in the chemistry of fats, fatty acids of this type are in most cases employed in the form of their technical mixtures. Typical examples of fatty acids of this type are caprylic, capric, lauric, myristic, palmitic, stearic, arachidic and behenic acid. It is preferable to use saturated fatty acids having 16 to 22 carbon atoms, including technical mixtures thereof, from the above list.

Typical examples of diamines to be employed in accordance with the invention are ethylenediamine, propylenediamines, butylenediamines, hexylenediamines, diaminocyclohexane, bis-methylaminocyclohexane, octylenediamines, decylenediamines and dodecylenediamines; ethylenediamine, tetramethylenediamine and hexamethylenediamine are preferred.

The fatty alcohols having 8 to 22 carbon atoms which can be employed in the process of the invention can be derived from the abovementioned fatty acids; typical examples of these fatty alcohols are caprylic, capric, lauryl, myristyl, cetyl, stearyl, arachidyl and behenyl alcohol, including technical mixtures thereof. Saturated fatty alcohols having 12 to 22 carbon atoms are preferred here, since they are solid even at elevated temperatures in these resulting mixtures of the invention.

Instead of, or together with, the fatty alcohols mentioned above, it is also possible to employ polyfunctional alkanols having 2 to 15, in particular 2 to 12, carbon atoms and 2 to 6 hydroxyl groups in the process of the invention. Preferred examples of polyfunctional alkanols of this type are ethylene glycol, propylene glycol, glycerol, diglycerol, triglycerol, tetraglycerol, trimethylolpropane, dimethylolpropane, pentaerythritol and dipentaerythritol; the use of other polyfunctional alkanols, such as neopentyl glycol, tripentaerythritol and the like, is, however, also possible. The polyfunctional alkanols are reacted in accordance with the invention with the fatty acids to give complete or partial esters.

Basic compounds of divalent metals employable in the process of the invention which should be mentioned are, in particular, the oxides, hydroxides and carbonates of Mg, Ca, Ba, Cd, Zn and Pb, Ca and/or Zn bases being preferred.

In a preferred embodiment of the invention 2.2 to 10, in particular 2.5 to 4, moles of the fatty acids present in the melt are employed in the condensation reaction per mole of diamine. The excess of fatty acid here depends on the content of fatty acid esters and, if desired, metal soaps in the mixtures to be prepared in accordance with the invention, efforts being made to keep the content of fatty acid ester as low as possible.

In another advantageous embodiment of the invention the fatty acid diamides, fatty acid esters and, if desired, the metal soaps in the melt containing the fatty acids are prepared in ratios by weight to one another of 4 to 6:1 to 2:2 to 4.

In the process of the invention the fatty acid present in the melt acts as a solvent, so that it is not necessary to add inert solvents.

In another advantageous embodiment of the invention the fatty acids and the diamines are subjected to a condensation reaction at melt temperatures of 140° to 190°, in particular 160° to 180° C. The water of reaction liberated in this process is removed continuously from the reaction mixture, and it can be advantageous to carry out the reaction under a slight vacuum; the same also holds for the esterification and soap formation steps.

The condensation reaction is preferably terminated when an amine number less than 1 has been reached. The amine number is defined as the amount of potassium hydroxide in milligrams required to neutralize the amount of hydrochloric acid bound by 1 g of reaction mixture.

In another advantageous embodiment of the invention the fatty acids and fatty alcohols or polyfunctional alkanols are reacted at melt temperatures of 150° to 190° C. in the presence of esterification catalysts. Esterification catalysts suitable for this purpose are well known to those skilled in the art; typical examples of these are tin catalysts, in particular tin oxalate.

In another advantageous embodiment of the invention the reaction of the fatty acids to give the metal soaps is carried out at melt temperatures within the range from 150° to 160° C. It is preferable to select a temperature below the reaction temperatures for amidation and esterification, in order to avoid side reactions, in case fatty acid diamides and fatty acid esters are already present in the reaction mixture.

The only important factor for the sequence of the process stages of amidation, esterification and soap formation is that the amidation should be carried out before the esterification. On the other hand, the formation of metal soaps can take place before and/or after the amidation and before and/or after the esterification. In general it is advantageous to carry out first the amidation, then the esterification and subsequently the soap formation in the melt containing the fatty acids. If, however, mixtures containing zinc soaps are to be prepared, solubility problems can result at relatively high zinc contents. It is therefore advantageous, in the preparation of such mixtures, to add a zinc soap of the fatty acids to the fatty acid melt before the amidation and esterification, and also, if desired, the soap formation, or to generate it in this mixture, for example by the introduction of zinc oxide. Surprisingly, the solubility problems mentioned above do not occur in this case, and there are also no disadvantages regarding the subsequent amidation and esterification. It is subsequently possible to react free fatty acids which may still be present with other basic metal compounds than ZnO, for example with CaO, to give the corresponding metal soaps, so that mixed soap systems are obtained. It is, moreover, also possible to use the process principle described here of preparing a fatty acid/metal soap mixture in the first stage in the case of all the other metal soaps which are suitable here. The preferred variant is, however, that in which the fatty acid diamides and fatty acid esters and also, if desired, the metal soaps from the group composed of Mg, Ca, Ba, Cd and Pb, in particular Ca soaps, are generated successively in the melt containing fatty acids and, if desired, zinc soaps.

In the preparation of mixtures of the invention which, besides fatty acid alkylenediamides and, if desired, metal soaps, contain esters of fatty acids with polyfunctional alkanols, it is possible to carry out the reaction in such a way, by selecting suitable mixing ratios, that the esters are present—at any rate arithmetically—as partial esters or as complete esters. If a mixture having a content of fatty acid partial esters is to be prepared, an excess of OH groups is used, relative to fatty acid carboxyl groups present. In this case the proportion of free fatty acids in the reaction mixture can fall so steeply that adequate fatty acids for possibly carrying out soap formation are no longer available. In these cases it is preferable to add further fatty acids having 8 to 22 carbon atoms to the reaction mixture after the amidation and esterification, so that a sufficient amount of fatty acids is available for the formation of soaps.

In general, the mixtures obtained in accordance with the invention have acid numbers less than 5, i.e. they only contain small proportions of free fatty acids or none at all. However, since a certain proportion of free fatty acids in the mixtures does not cause problems and, under certain circumstances, can even be advantageous if the mixtures are used as additives for plastic compositions based on PVC, mixtures having acid numbers within the range from 5 to 20 can also be obtained without difficulty in the process of the invention; this corresponds to a proportion of about 3 to 10% by weight of the free fatty acids in the total mixture. Mixtures of this type containing free fatty acids are particularly preferred in the case of systems containing zinc soaps, since these systems can be obtained in a completely homogeneous state in the presence of free fatty acids.

The invention also relates to mixtures of light-colored bis($C_8$–$C_{22}$-fatty acid) alkylenediamides and esters of $C_8$–$C_{22}$-fatty acids with fatty alcohols having 8 to 22 carbon atoms and/or polyfunctional alkanols having 2 to 15 carbon atoms and 2 to 6 hydroxyl groups and, if desired, metal soaps of $C_8$–$C_{22}$-fatty acids in ratios by weight to one another of 4 to 6:1 to 2:2 to 4, obtainable by a process of the present invention. Finally, the invention relates to the use of the mixtures mentioned above, containing light-colored bis($C_8$–$C_{22}$-fatty acid) alkylenediamides, as additives for plastics, in particular those based on PVC or copolymers thereof.

The invention is illustrated in greater detail below by means of preferred illustrative embodiments.

Description of some of the reagents employed in the illustrative embodiments (the percentages relate to percent by weight).

1. Technical stearic acid: Commercial quality, acid number 206 to 210, chain distribution: 4% < $C_{16}$, 45% $C_{16}$, 2% $C_{17}$, 47% $C_{18}$, 1% $C_{18}$ (monounsaturated) and 1% > $C_{18}$, iodine number about 1.
2. Lauric acid: Commercial quality, acid number 276 to 280, chain distribution: <1% $C_{10}$, >93% $C_{12}$ and 4 to 6% $C_{14}$.
3. Behenic acid: Commercial quality, acid number 164 to 168, chain distribution: <2% $C_{16}$, <3% $C_{18}$, <10% $C_{20}$, >80% $C_{22}$ and <2% $C_{24}$.
4. Tallow fat alcohol: Commercial quality, hydroxyl number 215 to 222, chain distribution <2% $C_{12}$, 3 to 7% $C_{14}$, 26 to 33% $C_{16}$, 60 to 65% $C_{18}$ and <2% $C_{20}$.
5. Hexamethylenediamine (HMDA) and ethylenediamine (EDA): commercial quality.

EXAMPLE 1

Mixture of Calcium Stearate, Bis(Stearic Acid) Hexamethylenediamide/Ethylene Glycol Stearate 728.5 g (2.70 moles) of technical stearic acid were initially placed in a reactor and heated to 100° C., and 86 g (0.74 mole) of hexamethylenediamine were added. The melt was heated to 170° C. under a protective gas; the water of the condensation reaction was removed continuously by distillation. When the amine number of the reaction mixture had reached a value less than 1, 50.4 g (0.81 mole) of ethylene glycol was added and the temperature was raised to 190° C. Esterification was carried out after the addition of 0.1 g of Sn oxalate, the water of reaction being removed under a slight vacuum. The reaction was terminated when the acid number of the reaction mixture had fallen below 5.

In order to form the calcium soap, 358.0 g (1.33 mole) of technical stearic acid was added to the reaction mixture. The temperature of the reaction mixture was then adjusted to 150° to 155° C.; subsequently 49.0 g (0.66 mole) of calcium hydroxide were added in portions in the course of 15 minutes; the water of reaction was removed under a water pump vacuum. After a reaction time of 2 hours, a pressure of 22 hPa had been set up; the acid number had fallen to 5. The melt was poured into a pan before solidification. The mixture of the title was obtained in the form of a slightly yellowish-tinged, waxlike mass having a melting point of 130° C. and a Ca content of 2.25%. The mixture contained 33% by weight of calcium stearate, 38% by weight of bis(stearic acid) hexamethylenediamide and 29% by weight of ethylene glycol mono/distearate.

EXAMPLE 2

Mixture of Zinc Stearate, Bis(Stearic Acid) Hexamethylenediamide and Ethylene Glycol Stearate 472.4 g (1.75 moles) of technical stearic acid were initially placed in a reactor and heated to 150° C., and 23.5 g (0.29 mole) of zinc oxide were added in portions in the course of 10 minutes. The water of neutralization formed was removed under a water pump vacuum; in the course of 1.5 hours a pressure of 30 hPa had been set up. 37.4 g (0.32 mole) of hexamethylenediamine were then added under a protective gas; subsequently the temperature was raised to 170° C. The progress of the reaction was controlled via the acid number. When an acid number of 48 (theory: 50) had been reached, 21.9 g (0.35 mole) of ethylene glycol and 0.1 g of tin oxalate were added. The reaction was continued under a slight vacuum of up to 450 hPa, until an acid number of 5 had been reached. The reaction time was 2.5 hours; the water of reaction was removed continuously. The melt was then cooled and poured at 150° C. into a pan in order to solidify. This gave a slightly yellowish-tinged, waxlike mass having a melting point of 135° C. and a Zn content of 3.6%. The composition of the product was 34% by weight of zinc stearate, 38% by weight of bis(stearic acid) hexamethylenediamide and 28% of ethylene glycol mono/distearate.

EXAMPLE 3

Mixture of Bis(Stearic Acid) Hexamethylenediamide and Ethylene Glycol Stearate (Ratio by Weight 1:1)

565.8 g (2.1 mole) of technical stearic acid (molecular weight 270) were heated to 100° C. with stirring, and 58 g (0.5 mole) of hexamethylenediamine were added under a protective gas. The temperature was raised to 170° C.; the water of reaction was removed continuously. The condensation reaction was terminated after an amine number less than 1 had been reached. 33.9 g (0.55 mole) of ethylene glycol and 0.2 g of tin oxalate were added at the same temperature; subsequently the temperature was raised to 190° C. The reaction was carried out under vacuum; the water of reaction was removed continuously. When the pressure had fallen to 25 hPa, the mixture was cooled to 150° C. The melt was poured into a pan in order to solidify. A yellowish-tinged, waxlike mass having a melting point of 127° C. was obtained.

EXAMPLE 4

Mixture of Bis(Stearic Acid) Hexamethylenediamide and Ethylene Glycol Stearate (Ratio by Weight 3:1)

891.7 g (3.30 moles) of technical stearic acid were initially placed in a reactor and heated to 100° C., and 140.3 g (1.21 moles) of hexamethylenediamine were added under a protective gas. The temperature was then raised to 170° C. under a protective gas; the condensation reaction was terminated after an amine number less than 1 had been reached. 27.4 g (0.44 moles) of ethylene glycol and 0.02% by weight, relative to the total mixture, of tin oxalate were then added. The temperature was raised to 190° C.; the esterification was carried out under vacuum. An acid number less than 10 had been reached after 3 hours. The melt was cooled and poured into a pan at 150° C. A yellowish-tinged, waxlike mass having a melting point of 135° C. was obtained.

EXAMPLE 5

Mixture of Bis(Stearic Acid) Hexamethylenediamide and Stearic Acid Diglyceride (Ratio by Weight 1:1)

559 g (2.06 moles) of technical stearic acid were heated to 100° C. with stirring, and 46.3 g (0.53 mole) of ethylenediamine were added in portions in the course of 15 minutes. The temperature was then raised to 170° C. under a protective gas. After a reaction time of 6 hours the amine number had fallen below 1. 36.3 g (0.50 mole) of glycerol and 0.2 g of tin oxalate were then added. The esterification of the free stearic acid was carried out under vacuum at 190° C. until an acid number less than 5 had been reached. After the mixture had been poured out at 150° C. into a pan, a slightly yellowish mass having a melting point of 127° C. was obtained.

EXAMPLE 6

Mixture of Bis(Lauric Acid) Hexamethylenediamide and Ethylene Glycol Laurate (Ratio of Weight 1:1)

443.0 g (2.21 moles) of technical lauric acid were heated to 100° C., and 60.4 g (0.52 mole) of hexamethylenediamine were added in portions under a protective gas. In order to carry out the condensation reaction the temperature was raised to 170° C. until the amine number had fallen to less than 1. 36.4 g (0.585 mole) of ethylene glycol and 0.2 g of tin oxalate were then added; the esterification of the free lauric acid was carried out under vacuum at 190° C. When the pressure had fallen to 25 hPa, the melt was cooled to 150° C. and poured into a pan. A beige-colored, waxlike mass having a solidification point of 128° C. was obtained.

EXAMPLE 7

Mixture of Bis(Behenic Acid) Hexamethylenediamide and Ethylene Glycol Behenate (Ratio by Weight 1:1)

464.5 g (1.37 mole) of behenic acid were heated to 100° C., and 38.2 g (0.33 mole) of hexamethylenediamine were added in portions under a protective gas. The temperature was then raised to 170° C. until an amine number less than 1 had been reached. 22.0 g (0.355 mole) of ethylene glycol and 0.2 g of tin oxalate were then added. The esterification was carried out under vacuum at 190° C. When the pressure had fallen to 25 hPa, the reaction mixture was cooled to 150° C. and poured into a pan. After solidification a beige-colored, waxlike mass having a melting point of 133.5° C. was obtained.

EXAMPLE 8

Bis(Stearic Acid) Ethylenediamide and Stearic Acid Tallow Fat Alcohol Ester (Ratio by Weight 3:1)

339.9 g (1.26 mole) of technical stearic acid were initially placed in a reactor and heated to 100° C., and 31.9 g (0.532 mole) of ethylenediamine were added in portions in the course of 15 minutes under a protective gas. After a reaction time of 6 hours at 170° C. the amine number had fallen to less than 1. 80 g (0.195 mole) of ditallow fat alcohol and 0.1 g of tin oxalate were then added; the esterification of the free stearic acid was carried out under vacuum at 190° C. When the pressure had fallen to 25 hPa, the reaction mixture was cooled to 150° C. and poured into a pan. After solidification a yellowish-tinged, waxlike mass having a melting point of 135.5° C. was obtained.

What is claimed:

1. A process for the preparation of mixtures of light-colored bis($C_8$-$C_{22}$-fatty acid) alkylenediamides and $C_8$-$C_{22}$-fatty acid esters and, optionally, metal soaps of $C_8$-$C_{22}$-fatty acids, said process comprising:
   (A) reacting a part of the fatty acid in a melt containing fatty acid or acids having 8 to 22 carbon atoms with diamines of the general formula $$NH_2-R-NH_2$$

in which R is a linear, branched or cyclic alkylene group having 2 to 12 carbon atoms, to give the corresponding fatty acid diamides, the amount of fatty acid present in said melt being in excess of the amount stoichiometrically required to react with all the diamines also present in the melt;
   (B) esterifying at least a part of the remaining fatty acid or acids with alcohols selected from the group consisting of fatty alcohols having 8 to 22 carbon atoms and polyfunctional alkanols having 2 to 15 carbon atoms and 2 to 6 hydroxyl groups; and, optionally,
   (C) reacting at least a part of the remaining fatty acid or acids with basic compounds of divalent metals to give the corresponding metal soaps,
   the condensation reaction step (A) being carried out before the esterification step (B).

2. The process as claimed in claim 1, wherein saturated fatty acid or acids having 16 to 22 carbon atoms, or mixtures thereof, are reacted.

3. The process as claimed in claim 1, wherein diamines selected from the group consisting of ethylenediamine, tetramethylenediamine and hexamethylenediamine are reacted in step (A).

4. The process as claimed in claim 1, wherein 2.2 to 10, moles of the fatty acid or acids present in the melt are employed in the condensation reaction per mole of diamine.

5. The process as claimed in claim 1, wherein the fatty acid diamides, fatty acid esters and, if present, the metal soaps in the melt after reaction steps (A), (B), and, if performed, (C), are present in ratios by weight to one another of 4 to 6:1 to 2:2 to 4.

6. The process as claimed in claim 1, wherein the fatty acids and diamines are subjected to a condensation reaction at a temperature of 140° to 190° C.

7. The process as claimed in claim 1, wherein the condensation reaction is terminated when the amine number of the reaction mixture has reached a value of less than 1.

8. The process as claimed in claim 1, wherein step (B) is performed at melt temperatures of 150° to 190° C. in the presence of esterification catalysts.

9. The process as claimed in claim 1, wherein saturated fatty alcohols having 12 to 22 carbon atoms are used for the esterification of the fatty acids.

10. The process as claimed in claim 1, wherein polyfunctional alkanols from the group composed of ethylene glycol, propylene glycol, glycerol, diglycerol, triglycerol, tetraglycerol, trimethylolpropane, di-trimethylolpropane, pentaerythritol and di-pentaerythritol are used for the esterification and are reacted with the fatty acids to give complete or partial esters.

11. The process as claimed in claim 1, wherein a reaction to give metal soaps is carried out at melt temperatures of 150° to 160° C.

12. The process as claimed in claim 1, wherein a reagent selected from the group consisting of oxides, hydroxides and carbonates of Mg, Ca, Ba, Cd, Zn and Pb, and mixtures thereof is used for the formation of the metal soaps of the fatty acids.

13. The process as claimed in claim 1, wherein, before the condensation reaction and any formation of other metal soaps, a zinc soap of the fatty acids is added to the melt containing the fatty acids or is generated in this melt.

14. The process as claimed in claim 1, wherein the fatty acid diamides and fatty acid esters and, optionally, metal soaps from the group consisting of Mg, Ca, Ba, Cd and Pb soaps, are generated successively in the melt containing fatty acids.

15. The process as claimed in claim 1, wherein further $C_8$–$C_{22}$-fatty acids are added to the melt containing the fatty acid diamides and the esters of the fatty acids with polyfunctional alkanols, before a reaction with the basic compounds of divalent metals.

16. The process as claimed in claim 1 for the preparation of mixtures containing zinc soaps, wherein fatty acids, zinc soaps or basic zinc compounds, and, optionally, basic compounds of other divalent metals, and also diamines and fatty alcohols or polyfunctional alkanols are reacted in molar ratios with one another to give acid numbers within the range from 5 to 20 in the mixtures.

17. Mixtures consisting essentially of light-colored bis-($C_8$–$C_{22}$-fatty acid) alkylenediamides and esters of $C_8$–$C_{22}$-fatty acids, and, optionally, metal soaps, said mixtures having ratios by weight of alkylenediamides to fatty acids esters and, if present, metal soaps of 4 to 6:1 to 2:2 to 4.

18. The process as claimed in claim 14, wherein a calcium soap is generated in the melt.

19. The process according to claim 6, wherein the fatty acids and diamines are subjected to a condensation reaction at temperatures in the range from 160° to 180° C.

20. The process as claimed in claim 4, wherein 2.5 to 4 moles of the fatty acid or acids per mole of diamine employed in the condensation reaction are present in the melt.

* * * * *